United States Patent
Patterson et al.

(10) Patent No.: US 10,394,440 B2
(45) Date of Patent: Aug. 27, 2019

(54) DRAG AND DROP ALWAYS SUM FORMULAS

(71) Applicant: Microsoft Technology Licensing, LLC, Redmond, WA (US)

(72) Inventors: Eric W. Patterson, Sammamish, WA (US); Karen X. Cheng, Seattle, WA (US); Benjamin Edward Rampson, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/451,168

(22) Filed: Mar. 6, 2017

(65) Prior Publication Data

US 2017/0242563 A1   Aug. 24, 2017

Related U.S. Application Data

(63) Continuation of application No. 13/280,754, filed on Oct. 25, 2011, now Pat. No. 9,588,953.

(51) Int. Cl.
*G06F 17/00* (2019.01)
*G06F 3/0486* (2013.01)
*G06F 17/24* (2006.01)
*G06F 3/0482* (2013.01)

(52) U.S. Cl.
CPC .......... *G06F 3/0486* (2013.01); *G06F 3/0482* (2013.01); *G06F 17/246* (2013.01)

(58) Field of Classification Search
CPC ............................ G06F 17/243; G06F 17/246
See application file for complete search history.

(56) References Cited

U.S. PATENT DOCUMENTS

| | | | | |
|---|---|---|---|---|
| 5,040,131 | A | * | 8/1991 | Torres ................... G06F 3/0481 715/210 |
| 5,588,105 | A | * | 12/1996 | Foster ................... G06F 3/0481 715/779 |
| 5,603,021 | A | * | 2/1997 | Spencer ................ G06F 17/246 |
| 5,717,939 | A | | 2/1998 | Bricklin et al. |
| 5,805,167 | A | | 9/1998 | Van Cruyningen |

(Continued)

FOREIGN PATENT DOCUMENTS

| CN | 1790240 | | 6/2006 |
|---|---|---|---|
| CN | 1834887 | A | 9/2006 |

(Continued)

OTHER PUBLICATIONS

"Office Action Issued in European Patent Application No. 12843280. 4", dated Nov. 28, 2017, 8 Pages.

(Continued)

*Primary Examiner* — Laurie A Ries (57) ABSTRACT

Inserting a formula at a location on a content surface in a user interface is provided. A user interface showing a status bar which includes one or more predetermined calculations may be displayed on a computer. The computer may receive a selection of a predetermined calculation from the status bar in the user interface. The selected predetermined calculation may then be dragged from the status bar and inserted at a drop location on the content surface in the user interface. The computer may then automatically generate a formula corresponding to the selected predetermined calculation in the user interface.

20 Claims, 9 Drawing Sheets

(56) References Cited

U.S. PATENT DOCUMENTS

| | | | |
|---|---|---|---|
| 5,874,952 A | 2/1999 | Morgan | |
| 5,896,491 A | 4/1999 | Englefield | |
| 6,055,548 A * | 4/2000 | Corner | G06F 17/246 715/212 |
| 6,157,935 A * | 12/2000 | Tran | G06F 3/04883 382/187 |
| 6,256,649 B1 * | 7/2001 | Mackinlay | G06F 17/246 345/473 |
| 6,385,662 B1 * | 5/2002 | Moon | G06F 9/542 719/318 |
| 6,430,584 B1 | 8/2002 | Comer et al. | |
| 7,266,763 B2 * | 9/2007 | Peyton-Jones | G06F 17/246 707/999.001 |
| 7,415,664 B2 * | 8/2008 | Aureglia | G06F 17/246 715/212 |
| 7,451,397 B2 * | 11/2008 | Weber | G06F 17/246 715/212 |
| 7,634,730 B2 * | 12/2009 | Weber | G06F 17/246 715/212 |
| 8,405,627 B2 | 3/2013 | Karlsson | |
| 8,436,821 B1 | 5/2013 | Plichta et al. | |
| 8,619,090 B2 * | 12/2013 | Spada | G06F 17/2264 345/581 |
| 9,588,953 B2 | 3/2017 | Patterson et al. | |
| 2003/0074647 A1 | 4/2003 | Andrew | |
| 2003/0112277 A1 | 6/2003 | Shteyn | |
| 2004/0093568 A1 | 5/2004 | Lerner et al. | |
| 2004/0103366 A1 | 5/2004 | Peyton-Jones et al. | |
| 2004/0168115 A1 * | 8/2004 | Bauernschmidt | G06F 17/2241 715/238 |
| 2005/0044496 A1 * | 2/2005 | Kotler | G06F 17/211 715/225 |
| 2005/0128181 A1 | 6/2005 | Wang et al. | |
| 2005/0188174 A1 * | 8/2005 | Guzak | G06F 17/30126 711/203 |
| 2006/0036945 A1 | 2/2006 | Radtke et al. | |
| 2006/0069635 A1 * | 3/2006 | Ram | G06Q 30/08 705/37 |
| 2006/0129929 A1 | 6/2006 | Weber et al. | |
| 2006/0129932 A1 * | 6/2006 | Weber | G06F 17/246 715/705 |
| 2006/0132812 A1 | 6/2006 | Barnes | |
| 2006/0188267 A1 * | 8/2006 | Gavrilovic | H04B 10/2537 398/188 |
| 2006/0203294 A1 * | 9/2006 | Makino | G06F 17/211 358/400 |
| 2006/0282818 A1 * | 12/2006 | DeSpain | G06F 17/246 717/109 |
| 2006/0288267 A1 | 12/2006 | DeSpain | |
| 2007/0061698 A1 | 3/2007 | Megiddo et al. | |
| 2007/0233811 A1 | 10/2007 | Rochelle et al. | |
| 2007/0244672 A1 | 10/2007 | Kjaer | |
| 2008/0168341 A1 * | 7/2008 | Payette | G06F 17/246 715/212 |
| 2009/0006939 A1 | 1/2009 | DeSpain et al. | |
| 2009/0044089 A1 | 2/2009 | Gur et al. | |
| 2009/0132996 A1 * | 5/2009 | Eldridge | G05B 15/02 717/108 |
| 2010/0049723 A1 * | 2/2010 | Aebig | G06F 17/246 715/212 |
| 2010/0058163 A1 | 3/2010 | Garcia-molina et al. | |
| 2010/0083086 A1 | 4/2010 | Berger | |
| 2010/0122194 A1 | 5/2010 | Rogers | |
| 2011/0040390 A1 * | 2/2011 | Blevins | G05B 19/0426 700/18 |
| 2012/0013540 A1 | 1/2012 | Hogan | |
| 2012/0072820 A1 | 3/2012 | Weinman, Jr. | |
| 2012/0144298 A1 | 6/2012 | Karlsson | |
| 2012/0162107 A1 | 6/2012 | Yoshizawa | |
| 2012/0180002 A1 | 7/2012 | Campbell et al. | |
| 2012/0260152 A1 | 10/2012 | Shimizu | |
| 2013/0067306 A1 | 3/2013 | Bhargav et al. | |
| 2013/0145244 A1 | 6/2013 | Rothschiller et al. | |
| 2014/0015782 A1 | 1/2014 | Kim et al. | |
| 2014/0033110 A1 | 1/2014 | Darden | |
| 2014/0189482 A1 | 7/2014 | Hill | |
| 2014/0289601 A1 | 9/2014 | Wang et al. | |
| 2014/0337720 A1 | 11/2014 | Park | |
| 2014/0372952 A1 | 12/2014 | Otero et al. | |

FOREIGN PATENT DOCUMENTS

| | | |
|---|---|---|
| EP | 965932 | 12/1999 |
| JP | 2000029451 | 6/1998 |
| JP | 2001173263 | 12/1999 |
| JP | 2004046657 | 7/2002 |
| WO | WO 2005043406 | 5/2005 |

OTHER PUBLICATIONS

Chinese Decision on Reexamination in Application 201210409069.0, dated Jun. 29, 2017, 14 pgs.

U.S. Appl. No. 13/918,891, Office Action dated Jan. 4, 2018, 35 pages.

"Apple—iWork for iOS—Numbers—Innovative Spreadsheets in Just a Few Taps", Published on: Jan. 30, 2013, Available at: https://www.apple.com/apps/iwork/numbers/.

"Using Dragon with Microsoft Excel—Command Cheat Sheet", Retrieved on: Apr. 18, 2013, Available at: http://www.nuance.com/naturallySpeaking/pdf/Dragon%20for%20EXCEL%20Cheat%20Sheet.pdf.

"Using the writing pad and touch keyboard inTablet PC Input Panel", Jun. 4, 2013, pp. 1-4.

Chapter Four: Introducing Excel Formulas, available at: http://www.cob.sjsu.edu/splane_m/excelformulas.htm, Aug. 10, 2011, pages.

Chinese Notification of Reexamination in Application 201210409069.0, dated Feb. 3, 2017, 6 pgs.

Chinese Office Action in 201210409069.0, dated Sep. 3, 2014, 12 pages.

Chinese Office Action in 201210409069.0, dated Apr. 29, 2015, 9 pages.

Chinese Office Action in 201210409069.0, dated Nov. 3, 2015, 13 pages.

Chinese Office Action in 201210409069.0, dated May 3, 2016, 10 pages.

Diamond, Stephanie, "How to Choose Spreadsheet Functions with NaturallySpeaking", Retrieved on: Apr. 22, 2013, Available at: http://www.dummies.com/how-to/content/how-to-choose-spreadsheet-functions-with-naturally.navId-810228.html.

Diamond, Stephanie, "Input Spreadsheet Data with NaturallySpeaking", Retrieved on: Apr. 22, 2013, Available at: http://www.dummies.com/how-to/content/input-spreadsheet-data-with-naturallyspeaking.navId-810228.html.

European Extended Search Report in 12843280.4, dated Jul. 390, 2015, 10 pages.

Excel 2007: Basic: Crisp Comprehensive Series, 2007.

Gottfried, et al., "Graphical Definitions—Making Spreadsheets Visual through Direct Manipulation and Gestures", In Proceedings of IEEE Symposium on Visual Languages, Sep. 23, 1997, 8 pages.

Japenese Notice of Allowance in Application 2014538907, dated Oct. 3, 2016, 4 pages.

Matlab Simulink; "Simulink7: Getting Started Guide"; Copyright 2010; 81 pgs.

PCT 2nd Written Opinion in PCT/US2014/041074, dated Jul. 22, 2015, 11 pages.

PCT International Preliminary Report on Patentability in PCT/US2012/061583, dated Apr. 29, 2014, 4 pages.

PCT International Search Report in PCT/US2012/061583, dated Feb. 28, 2013, 9 pages.

PCT International Search Report in PCT/US2014/041074, dated Oct. 15, 2014, 23 pages.

PCT International Search Report on Patentability in PCT/US2014/041074, dated Oct. 15-14, 2015, 22 pages.

Spreadsheeting II: Good Spreadsheet Design. available at: http://www.geekgirls.com/spreadsheet02.htm, Aug. 10, 2011, -pages.

(56) References Cited

OTHER PUBLICATIONS

Table addition, available at: http://www.officekb.com/UWE/Forum.aspx/word-tables/2349/Table-addition, Aug. 11, 2011, -pages.
U.S. Appl. No. 13/280,754, Notice of Allowance dated Oct. 24, 2016, 12 pages.
U.S. Appl. No. 13/280,754, Office Action dated Jul. 17, 2013, 20 pages.
U.S. Appl. No. 13/280,754, Office Action dated Apr. 1, 2014, 10 pages.
U.S. Appl. No. 13/280,754, Office Action dated Jul. 7, 2015, 17 pages.
U.S. Appl. No. 13/280,754, Office Action dated Feb. 25, 2016, 17 pages.
U.S. Appl. No. 13/280,754, USPTO Response dated Dec. 23, 2016, 3 pages.
U.S. Appl. No. 13/280,754, USPTO Response dated Dec. 9, 2016, 2 pages.
U.S. Appl. No. 13/918,891, Office Action dated Feb. 27, 2015, 24 pages.
U.S. Appl. No. 13/918,891, Office Action dated Sep. 22, 2015, 24 pages.
U.S. Appl. No. 13/918,891, Office Action dated Jul. 28, 2016, 25 pages.
Yao, Paul, "Add Support for Digital Ink to Your Windows Applications", Published on: Dec. 2004, Available at: http://msdn.microsoft.com/en-us/magazine/cc163869.aspx.
U.S. Appl. No. 13/918,891, Office Action dated May 25, 2016, 26 pages.
Chinese 1st Office Action in Application 201480045374.3, dated May 11, 2017, 13 pgs.
European Office Action in Application 14736151.3, dated May 8, 2017, 7 pgs.
Anonymous, "Aug. 13, 2014 Using the writing pad and touch keyboard in Tablet PC Input Panel", Web Archive Copy of Webpage, Jun. 4, 2013, pp. 1-4, retrieved from the internet at: http://web.archive.org/web/20130604014640/http://windows.microsoft.com/en-us/windows7/using-the-writing-pad-and-touch-keyboard-in-tablet-pc-input-panel (retrieved in Aug. 13, 2014).
"Final Office Action Issued in U.S. Appl. No. 13/918,891", dated Sep. 10, 2018, 27 Pages.
"Second Office Action Issued in Chinese Patent Application No. 2014800453743", dated Apr. 16, 2018, 12 Pages.
"Third Office Action Issued in Chinese Patent Application No. 2014800453743", dated Dec. 6, 2018, 9 Pages.
"Calculate a Range Automatically : Range Formula Microsoft Office Excel 2007 Tutorial", Retrieved from: https://web.archive.org/web/20100329142311/http://www.java2s.com/Tutorial/Microsoft-Office-Excel-2007/0120_Formula/CalculateaRangeAutomatically.htm, Mar. 29, 2010, 2 Pages.
"Office Action Issued in European Patent Application No. 12843280.4", dated Feb. 18, 2019, 3 Pages.
Jelen, Bill, "Subtotal tricks", Retrieved from: https://sfmagazine.com/wp-content/uploads/sfarchive/2008/05/EXCEL-Subtotal-tricks.pdf, May 1, 2008, 3 Pages.
"Final Office Action Issued in Chinese Patent Application No. 201480045374.3", dated Apr. 10, 2019, 9 Pages.
"Office Action Issued in European Patent Application No. 14736151.3", dated May 27, 2019, 9 Pages.

\* cited by examiner

| | A | B | C | D | E | G | H | I |
|---|---|---|---|---|---|---|---|---|
| 1 | | | | | | | | |
| 2 | KEY | NAME | COST | PRICE | WEIGHT | DTM | MOD. NAME | |
| 3 | 348 | BLK | 1898 | 3375 | 20.35 | 11 | MT-100 | |
| 4 | 349 | BLK | 1898 | 3375 | 20.77 | 5 | MT-100 | |
| 5 | 350 | BLK | 1898 | 3375 | 21.13 | 8 | MT-100 | |
| 6 | 351 | SLV | 1912 | 3400 | 21.42 | 7 | MT-100 | |
| 7 | 344 | SLV | 1912 | 3400 | 20.35 | 5 | MT-100 | |
| 8 | 345 | SLV | 1912 | 3400 | 20.77 | 14 | MT-100 | |
| 9 | 346 | BLK | 1106 | 2049 | 21.13 | 14 | MT-100 | |
| 10 | 347 | BLK | 1106 | 2071 | 21.42 | 13 | MT-100 | |
| 11 | 358 | BLK | 1106 | 2071 | 23.35 | 10 | MT-200 | |
| 12 | 359 | SLV | 1118 | 2295 | 23.35 | 11 | MT-200 | |
| 13 | 361 | SLV | 1118 | 2295 | 23.77 | 9 | MT-200 | |
| 14 | 360 | SLV | 1118 | 2295 | 23.77 | 9 | MT-200 | |
| 15 | 363 | BLK | 1265 | 2319 | 24.13 | 6 | MT-200 | |
| 16 | 352 | BLK | 598 | 1079 | 24.13 | 14 | MT-200 | |
| 17 | 353 | BLK | 598 | 1079 | 23.35 | 13 | MT-200 | |
| 18 | 355 | SLV | 598 | 1079 | 23.35 | 12 | MT-200 | |
| 19 | 354 | SLV | 598 | 1079 | 23.77 | 8 | MT-200 | |
| 20 | 356 | BLK | 598 | 1079 | 23.77 | 5 | MT-200 | |
| 21 | 357 | BLK | 598 | 1079 | 24.13 | 11 | MT-200 | |
| 22 | 364 | SLV | 598 | 1079 | 24.13 | 9 | MT-200 | |
| 23 | 365 | SLV | 598 | 1079 | 25.35 | 13 | MT-300 | |
| 24 | 366 | BLK | 598 | 1079 | 25.77 | 10 | MT-300 | |
| 25 | 367 | BLK | 598 | 1079 | 26.13 | 5 | MT-300 | |
| 26 | 368 | SLV | 598 | 1079 | 26.42 | 12 | MT-300 | |

AVERAGE: 23.16   COUNT: 24   SUM: 556.01

FIG. 3

| | A | B | C | D | E | G | H | I |
|---|---|---|---|---|---|---|---|---|
| 1 | | | | | 315 | | | |
| 2 | KEY | NAME | COST | PRICE | WEIGHT | DTM | MOD. NAME | |
| 3 | 348 | BLK | 1898 | 3375 | 20.35 | 11 | MT-100 | |
| 4 | 349 | BLK | 1898 | 3375 | 20.77 | 5 | MT-100 | |
| 5 | 350 | BLK | 1898 | 3375 | 21.13 | 8 | MT-100 | |
| 6 | 351 | SLV | 1912 | 3400 | 21.42 | 7 | MT-100 | |
| 7 | 344 | SLV | 1912 | 3400 | 20.35 | 5 | MT-100 | |
| 8 | 345 | SLV | 1912 | 3400 | 20.77 | 14 | MT-100 | |
| 9 | 346 | BLK | 1106 | 2049 | 21.13 | 14 | MT-100 | |
| 10 | 347 | BLK | 1106 | 2071 | 21.42 | 13 | MT-100 | |
| 11 | 358 | BLK | 1106 | 2071 | 23.35 | 10 | MT-200 | |
| 12 | 359 | SLV | 1118 | 2295 | 23.35 | 11 | MT-200 | |
| 13 | 361 | SLV | 1118 | 2295 | 23.77 | 9 | MT-200 | |
| 14 | 360 | SLV | 1118 | 2295 | 23.77 | 9 | MT-200 | |
| 15 | 363 | BLK | 1265 | 2319 | 24.13 | 6 | MT-200 | |
| 16 | 352 | BLK | 598 | 1079 | 24.13 | 14 | MT-200 | |
| 17 | 353 | BLK | 598 | 1079 | 23.35 | 13 | MT-200 | |
| 18 | 355 | SLV | 598 | 1079 | 23.35 | 12 | MT-200 | |
| 19 | 354 | SLV | 598 | 1079 | 23.77 | 8 | MT-200 | |
| 20 | 356 | BLK | 598 | 1079 | 23.77 | 5 | MT-200 | |
| 21 | 357 | BLK | 598 | 1079 | 24.13 | 11 | MT-200 | |
| 22 | 364 | SLV | 598 | 1079 | 24.13 | 9 | MT-200 | |
| 23 | 365 | SLV | 598 | 1079 | 25.35 | 13 | MT-300 | |
| 24 | 366 | BLK | 598 | 1079 | 25.77 | 10 | MT-300 | |
| 25 | 367 | BLK | 598 | 1079 | 26.13 | 5 | MT-300 | |
| 26 | 368 | SLV | 598 | 1079 | 26.42 | 12 | MT-300 | |
| 27 | | | | | | | | |
| 28 | | | | 320 | | | | |
| 29 | AVERAGE | WEIGHT | 23.16 | | | | | |
| 30 | | 410 | | | | | | |

MOBILE COMPUTING DEVICE

DRAG AND DROP ALWAYS SUM FORMULAS

CROSS-REFERENCE TO RELATED APPLICATIONS

This application is a continuation application and claims priority to U.S. patent application Ser. No. 13/280,754, filed Oct. 25, 2011, entitled "DRAG AND DROP ALWAYS SUM FORMULAS," now issued U.S. Pat. No. 9,588,953, which application is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Computer productivity applications include functionality for users to enter formulas to perform calculations on data which may be displayed in a table created by a spreadsheet or word processing application. Generally, the task of entering or typing formulas is a difficult task for many users in that they have to learn all of the function names and a syntax for the typing in of formulas in an application. The aforementioned task is even more difficult on tablet or touch slate type devices because of the added difficulty of typing on virtual or on-screen keyboards. For example, on many tablet computing devices, users must change to different keyboard views to gain access between symbols (such as mathematical operators), numbers and text. It is with respect to these considerations and others that the various embodiments described herein have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for inserting a formula at a location on a content surface in a user interface. A user interface showing a status bar which includes one or more predetermined calculations may be displayed on a computer. The computer may receive a selection of a predetermined calculation from the status bar in the user interface. The selected predetermined calculation may then be dragged from the status bar and inserting at a drop location on the content surface in the user interface. The computer may then automatically generate a formula corresponding to the selected predetermined calculation in the user interface.

These and other features and advantages will be apparent from a reading of the following detailed description and a review of the associated drawings. It is to be understood that both the foregoing general description and the following detailed description are illustrative only and are not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

FIG. 4 is a computer screen display of a user interface showing a descriptive label added to the display of a predetermined calculation at a drop location on a content surface, in accordance with an embodiment;

DETAILED DESCRIPTION

Embodiments are provided for inserting a formula at a location on a content surface in a user interface. A user interface showing a status bar which includes one or more predetermined calculations may be displayed on a computer. The computer may the receive a selection of a predetermined calculation from the status bar in the user interface. The selected predetermined calculation may then be dragged from the status bar and inserting at a drop location on the content surface in the user interface. The computer may then automatically generate a formula corresponding to the selected predetermined calculation in the user interface.

Figure 1:
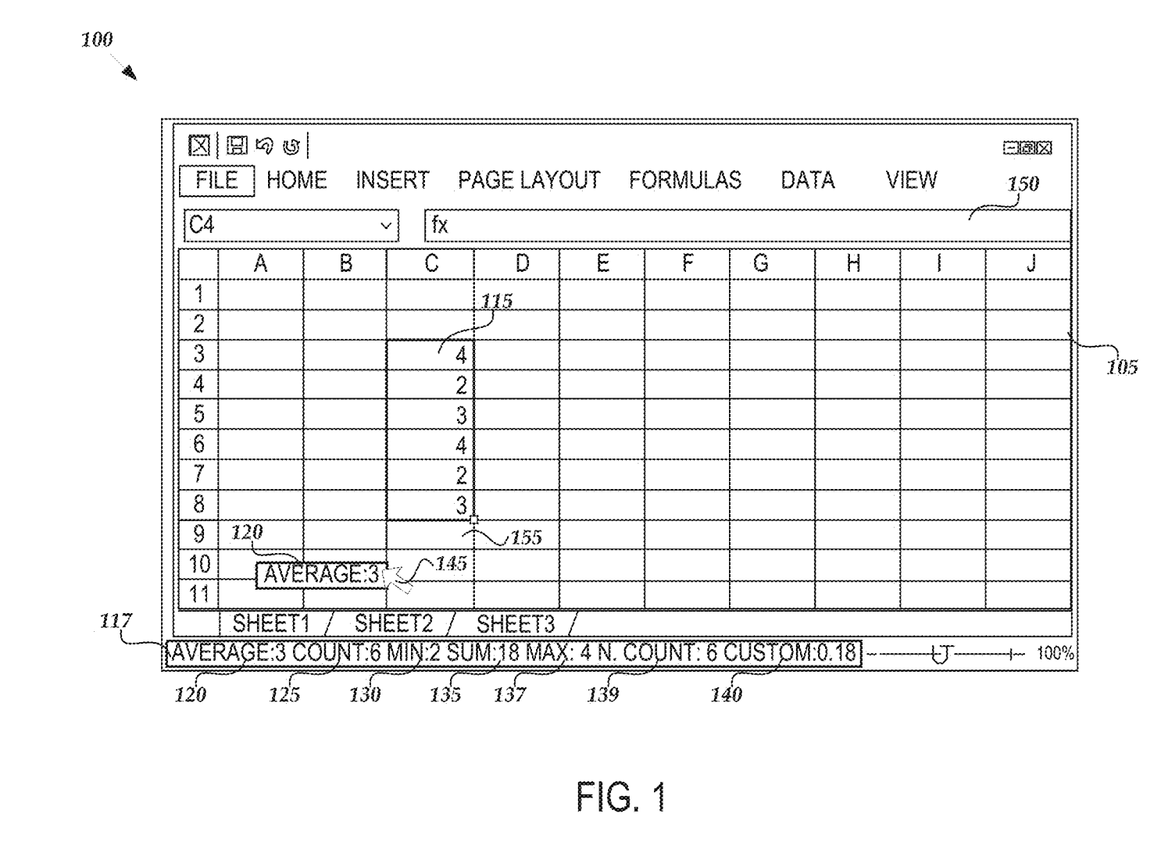
FIG. 1 is a computer screen display of a user interface showing a predetermined calculation being dragged from a status bar to a drop location on a content surface, in accordance with an embodiment.

FIG. 1 is a computer screen display of a user interface 100 showing a predetermined calculation 120 being dragged from a status bar 117 to a drop location 155 on a content surface 105, in accordance with an embodiment. The user interface 100 may be generated by a productivity application executed by a computer. In accordance with an embodiment, the productivity application may include a client or web-based spreadsheet application such as the EXCEL spreadsheet software from MICROSOFT CORPORATION of Redmond Wash. It should be understood, however, that other spreadsheet applications from other manufacturers may be utilized in accordance with the various embodiments described herein. It should be appreciated by those skilled in the art that other productivity applications may also be utilized in accordance with the various embodiments described herein. The other productivity applications may include, but are not limited to, word processing software, presentation graphics software, diagramming software, project management software, publishing software and note-taking software. It should be appreciated that the aforementioned productivity applications may comprise individual application programs or alternatively, may be incorporated into a suite of productivity applications such as the OFFICE application program suite from MICROSOFT CORPORATION.

The content surface 105 in the user interface 100 may comprise a spreadsheet application worksheet (i.e., a spreadsheet) for displaying data values 115 which may be displayed in a column in the content surface 105. The status bar 117 may display a number of predetermined calculations which are automatically generated from commonly used formulas based upon the data values 115. In accordance with an embodiment, the productivity application utilized for generating the content surface 105 may further be configured to automatically generate predetermined calculations which may include, but are not limited to, Average 120, Count 125, Min 130, Sum 135, Max 137 and Numerical Count 139 on selected cells containing the data values 115 based on commonly used formulas, such as aggregate functions. For example, in response to a selection of the data values in the cells C3 through C8, the productivity application may automatically utilize formulas (i.e., aggregate functions) for calculating the average, count, min and sum of the selected data values and display the results in the status bar 117. It should be understood that other aggregate functions may also be utilized in accordance with the embodiments described herein. It should further be understood, that in accordance with an embodiment, the predetermined calculations may also be associated with formulas other than aggregate functions. For example, for a word processing document, the productivity application described herein may be configured to automatically utilize field codes (i.e., placeholders for data that might change in a document) instead of aggregate functions to automatically calculate dates and page numbers associated with document, for display in the status bar 117. Similarly, for a presentation document, the productivity application described herein may be configured to automatically utilize program instructions to automatically calculate slide numbers for slides comprising the presentation document, for display in the status bar 117. The status bar 117 may also display a Custom calculation 140 which may be the result of a user-created formula. For example, the Custom calculation 140 represents a sum of the data values 115 in the range of cells C3:C8 divided by 100. It should be understood that other custom calculations may also be defined without departing from the scope of the embodiments described herein such as converting feet to inches. In accordance with an embodiment, custom calculations may be created by typing a formula in a spreadsheet cell and dragging the formula to the status bar 117 such that any range of cells selected on a spreadsheet would be automatically calculated according to the user-created formula.

As briefly discussed above, the user interface 100 shows the predetermined calculation Average 120 being dragged from the status bar 117 to drop location 155 on the content surface 105. In accordance with an embodiment, the dragging of the predetermined calculation Average 120 from the status bar 117 may be initiated on a computing device in response to a user navigating pointer 145 to the predetermined calculation Average 120, using a computer input device (e.g., a mouse) to drag the predetermined calculation Average 120 onto the content surface 105 towards the drop location 155. In accordance with another embodiment, the dragging of the predetermined calculation Average 120 may be initiated by a user in response to a touch input on a touch-enabled computing device, such as a tablet or touch slate type device, by using a finger or stylus to drag the predetermined calculation Average 120 from the status bar 117 onto the content surface 105 towards the drop location 155. In accordance with yet another embodiment, the dragging of the predetermined calculation Average 120 may be initiated by a user in response to a touch input on a touch-enabled computing device, such as a tablet or touch slate type device, by tapping once (with a finger or stylus) on the predetermined calculation Average 120 to select it as a user interface element (e.g., a button) and then dragging the user interface element onto the content surface 105 towards the drop location 155. It should be understood that the examples discussed above may also be applied to the dragging and dropping of custom calculations such as the Custom calculation 140.

In accordance with an embodiment, the drop location 155 may comprise a user-determined cell in a spreadsheet for displaying predetermined or custom calculations dragged from the status bar 117. The user interface 100 further includes a formula bar 150 which may be utilized to display the formula corresponding to a predetermined or custom calculation after the predetermined or custom calculation has been dropped onto the drop location 155.

Figure 2:
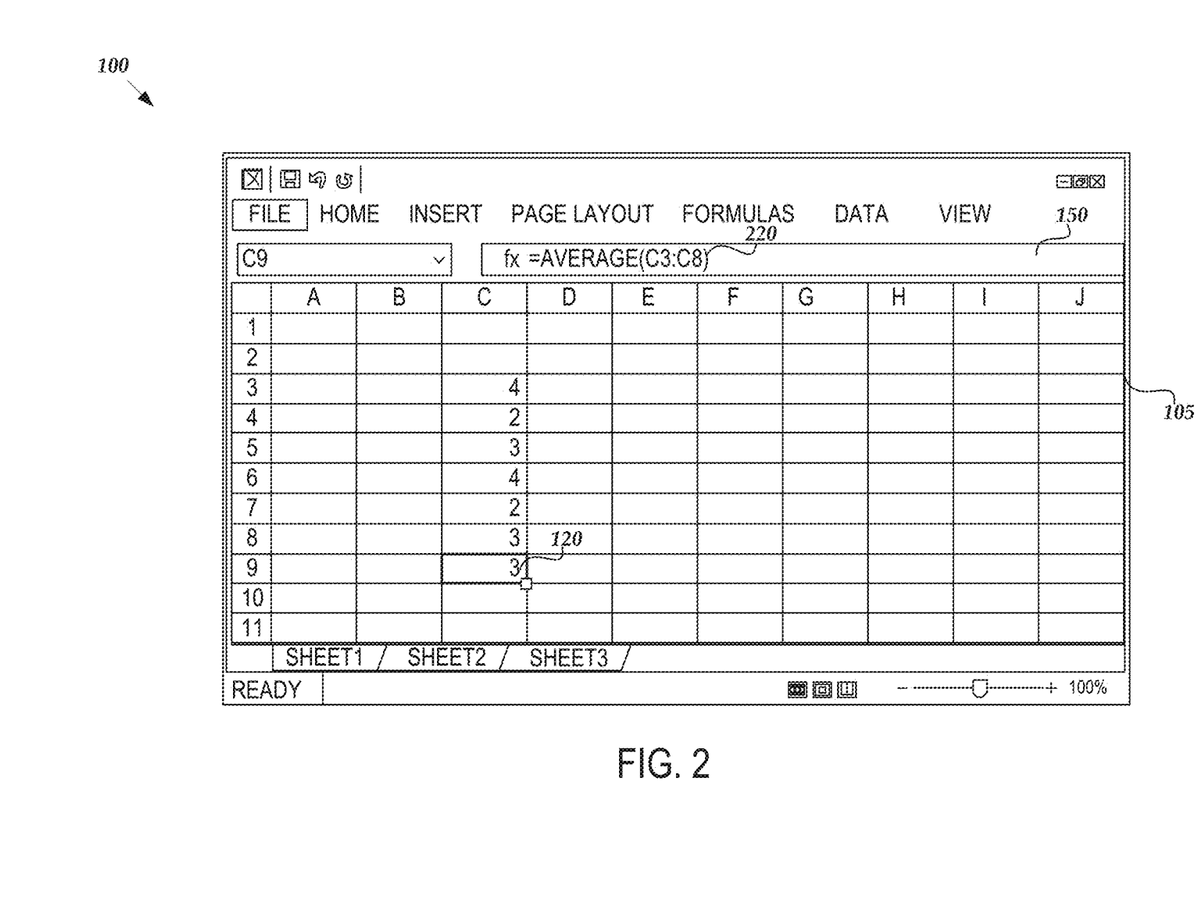
FIG. 2 is a computer screen display of a user interface showing a formula which was generated following the dropping of a predetermined calculation at a drop location on a content surface, in accordance with an embodiment.

FIG. 2 is a computer screen display of the user interface 100 of FIG. 1 showing a formula 220 which was generated following the dropping of predetermined calculation 120 at the drop location on the content surface 105, in accordance with an embodiment. In accordance with the present embodiment, the productivity application may generate the formula 220 in the formula bar 150 following the dropping of a predetermined calculation such, as the predetermined calculation Average 120, on the content surface 105.

Figure 3:
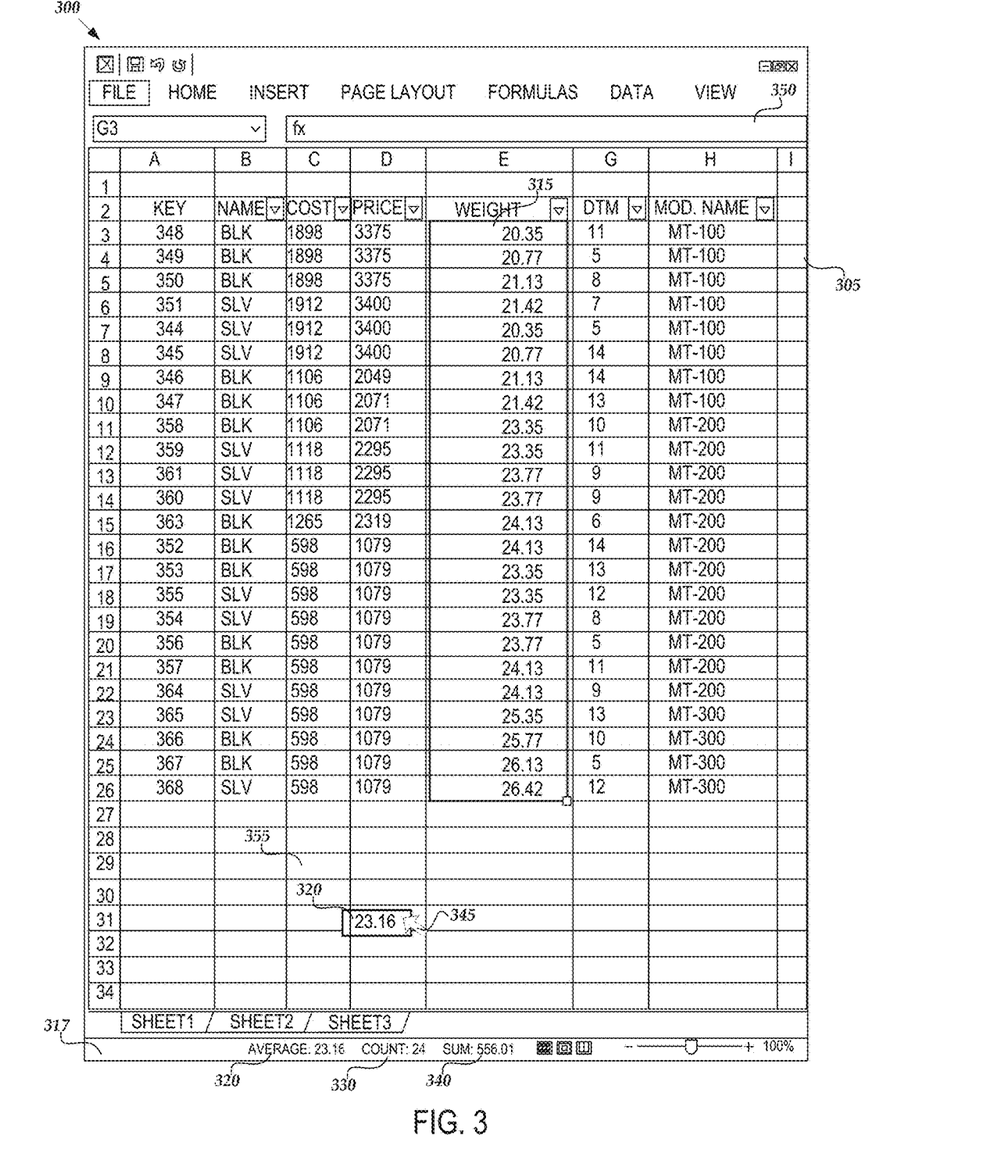
FIG. 3 is a computer screen display of a user interface showing a predetermined calculation being dragged from a status bar to a drop location on a content surface, in accordance with another embodiment.

FIG. 3 is a computer screen display of a user interface 300 showing a predetermined calculation 320 being dragged from a status bar 317 to a drop location 355 on a content surface 305, in accordance with another embodiment. The user interface 300 may be generated by a productivity application executed by a computer and, as discussed above with respect to the user interface 100 of FIG. 1, may include a client or web-based spreadsheet application, word processing software, presentation graphics software, diagramming software, project management software, publishing software and note-taking software. It should be appreciated that the aforementioned productivity applications may comprise individual application programs or alternatively, may be incorporated into a suite of productivity applications.

The content surface 305 in the user interface 300 may comprise a spreadsheet application worksheet (i.e., a spreadsheet) for displaying data values 315 (i.e., Weight) which may be displayed as a column in table in the content surface 305. The status bar 317 may display a number of predetermined calculations which are automatically generated from commonly used formulas based upon the data values 315. In accordance with an embodiment, the productivity application utilized for generating the content surface 305 may further be configured to automatically generate predetermined calculations which may include, but are not limited, to Average 320, Count 330 and Sum 340, on selected cells (i.e., the cells E3 through E26) containing the data values 315.

As briefly discussed above, the user interface 300 shows the predetermined calculation Average 320 being dragged from the status bar 317 to drop location 355 on the content surface 305. In accordance with an embodiment, the dragging of the predetermined calculation Average 320 from the status bar 317 may be initiated on a computing device in response to a user navigating pointer 345 to the predetermined calculation Average 320, using a computer input device (e.g., a mouse) to drag the predetermined calculation Average 320 onto the content surface 305 towards the drop location 355. In accordance with another embodiment, the dragging of the predetermined calculation Average 320 may be initiated by a user in response to a touch input on a touch-enabled computing device, such as a tablet or touch slate type device, by using a finger or stylus to drag the predetermined calculation Average 320 from the status bar 317 onto the content surface 305 towards the drop location 355. In accordance with yet another embodiment, the dragging of the predetermined calculation Average 320 may be initiated by a user in response to a touch input on a touch-enabled computing device, such as a tablet or touch slate type device, by tapping once (with a finger or stylus) on the predetermined calculation Average 320 to select it as a user interface element (e.g., a button) and then dragging the user interface element onto the content surface 305 towards the drop location 355. In accordance with an embodiment, the drop location 355 may comprise a user-determined cell in a spreadsheet for displaying predetermined calculations dragged from the status bar 317.

FIG. 4 is a computer screen display of the user interface 300 showing a descriptive label 410 added to the display of a predetermined calculation at a drop location on the content surface 305, in accordance with an embodiment. In accordance with the present embodiment, the productivity application may automatically generate and display the descriptive label 410 "Average Weight" adjacent to the predetermined calculation Average 320 representing the average weight of the selected range comprising the cells E2:E26 on the content surface 305. Thus, it should be appreciated that, in accordance with an embodiment, if a currently selected range is part of a well-defined construct, such as a column in a table, the productivity application may be configured to insert a label in a cell adjacent to the cell that a predetermined calculation was dragged to from the status bar. It should be understood, however, that the productivity application may also be configured even if a currently selected range is not part of a well-defined construct. For example, the productivity application may be configured to label a calculation as "Average," even if the productivity application is unable to determine whether or not a currently selected range is part of a table or has a defined structure.

Figure 5:
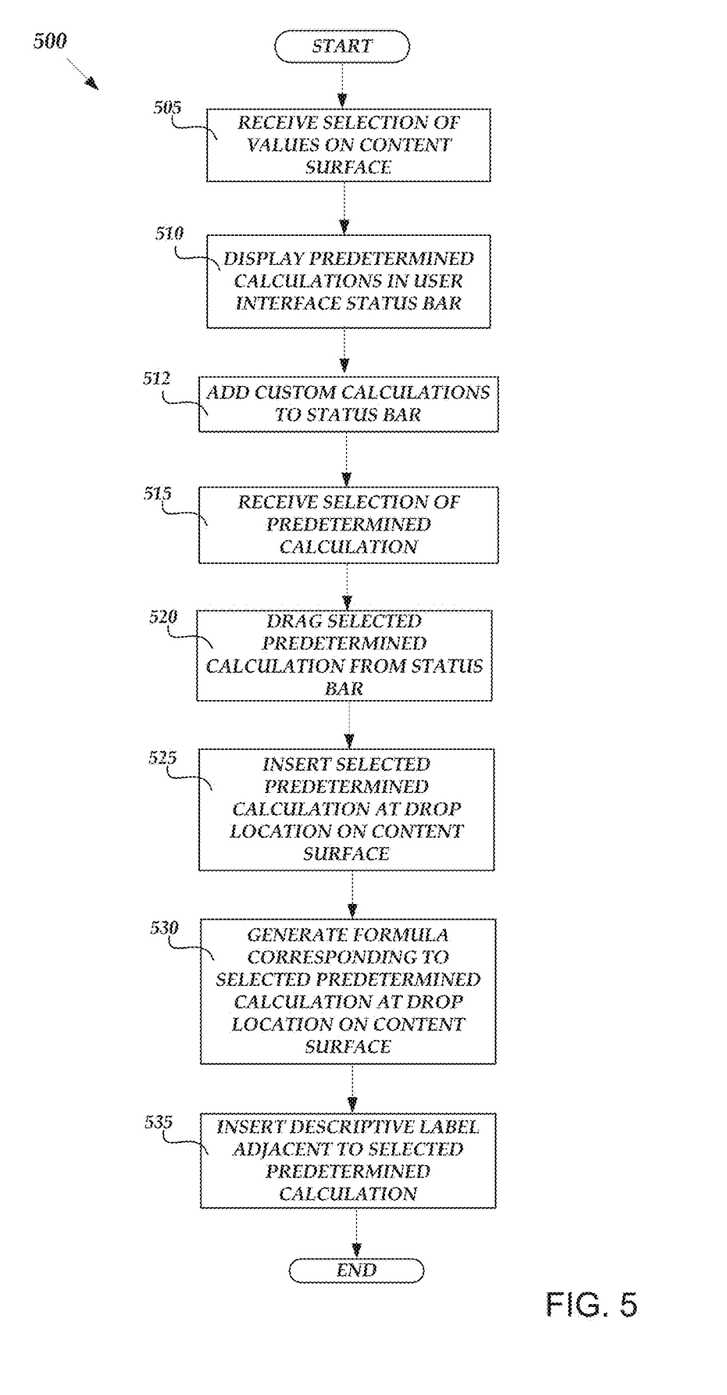
FIG. 5 is a flow diagram illustrating a routine for inserting a formula at a location on a content surface in a user interface, in accordance with an embodiment.

FIG. 5 is a flow diagram illustrating a routine 500 for inserting a formula at a location on a content surface in a user interface, in accordance with an embodiment. When reading the discussion of the routine presented herein, it should be appreciated that the logical operations of various embodiments are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the various embodiments. Accordingly, the logical operations illustrated in FIG. 5 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the various embodiments as recited within the claims set forth herein.

The routine 500 begins at operation 505, where a computing device may be utilized to execute a productivity application for receiving, in a user interface, a selection of a range of values on a content surface. In accordance with an embodiment, a user may select the range by using a computer input device (e.g., a mouse) to manually select a range of values on the content surface (e.g., a range of cells in a spreadsheet) or, alternatively, the user may select the range through the use of touch input which may include using a finger to select the range of values displayed on a tablet or mobile slate computing device.

From operation 505, the routine 500 continues to operation 510, where the productivity application executing on the computing device may display predetermined calculations in a user interface status bar. In particular, the productivity application may be configured to display a status bar which includes one or more aggregate function results which may include, without limitation, an average, a count, a minimum, a maximum, a numerical count and a sum.

From operation 510, the routine 500 continues to optional operation 512, where the productivity application executing on the computing device may add one or more custom calculations to the status bar in the user interface. As discussed above with respect to FIG. 1, custom calculations may be the result of a user-created formula. In accordance with an embodiment, custom calculations may be created by typing a formula in the productivity application and then dragging the formula to the status bar such that any range of values selected on the content surface would be automatically calculated according to the user-created formula.

From operation 512, the routine 500 continues to operation 515, where the productivity application executing on the computing device may receive a selection of a predetermined calculation in the status bar. For example, the productivity application may receive the selection of a predetermined calculation result indicating the average of numerical values in a group of currently selected cells in a spreadsheet.

From operation 515, the routine 500 continues to operation 520, where the productivity application executing on the computing device may drag the selected predetermined calculation from the status bar. In particular, the productivity application, after receiving an input from a computer input device or a touch input, may drag the selected predetermined calculation from the status bar to a "drop location" (e.g., a user-determined cell in a spreadsheet).

From operation 520, the routine 500 continues to operation 525, where the productivity application executing on the computing device may insert the selected predetermined calculation at a drop location on the content surface in the user interface. For example, the selected predetermined calculation may be dropped into a predetermined (i.e., predetermined by the user) cell in a spreadsheet.

From operation 525, the routine 500 continues to operation 530, where the productivity application executing on the computing device may automatically generate a formula corresponding to the selected predetermined calculation in the user interface. For example, as discussed above with respect to FIG. 1, the productivity application may generate the formula in a formula bar in the user interface following the dropping of a predetermined calculation at the drop location on the content surface.

From operation 530, the routine 500 continues to operation 535, where the productivity application executing on the computing device may automatically insert a descriptive label in the content surface adjacent to the at least one predetermined calculation. For example, as discussed above with respect to FIG. 4, if a currently selected range on the content surface is part of a well-defined construct, such as a column in a table, the productivity application may be configured to insert a label in a cell adjacent to the cell that a predetermined calculation was dragged to from the status bar. From operation 535, the routine 500 then ends.

Figure 6:
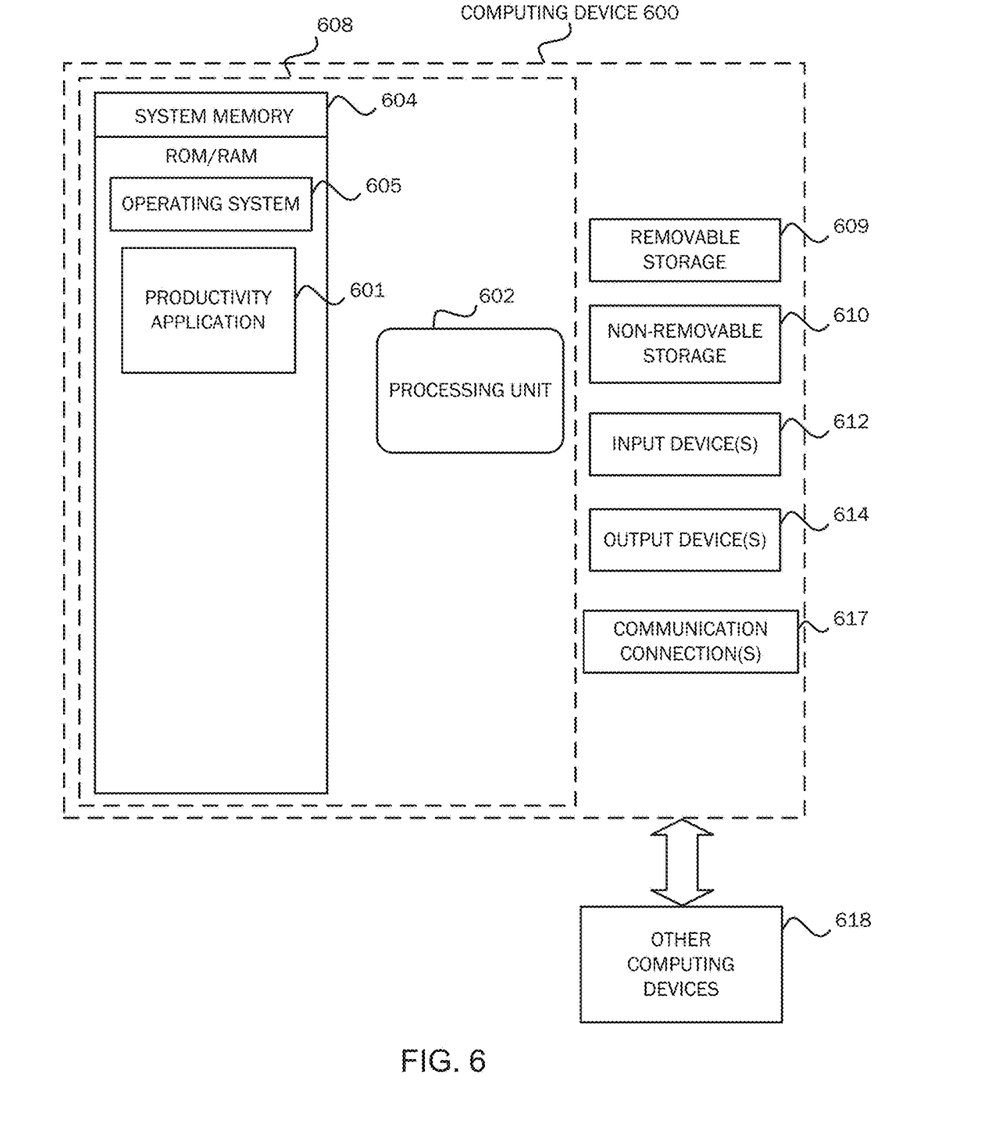
FIG. 6 is a simplified block diagram of a computing device with which various embodiments may be practiced.

FIG. 6 is a block diagram illustrating example physical components of a computing device 600 with which various embodiments may be practiced. The computing device components described below may be suitable for the computing device described above with respect to FIG. 5. In a basic configuration, the computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination. System memory 604 may include an operating system 605 and productivity application 601. Operating system 605, for example, may be suitable for controlling computing device 600's operation and, in accordance with an embodiment, may comprise the WINDOWS operating systems from MICROSOFT CORPORATION of Redmond, Wash. It should be understood that the embodiments described herein may also be practiced in conjunction with other operating systems and application programs and further, is not limited to any particular application or system.

The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage 609 and a non-removable storage 610.

While executing on the processing unit 602 of the computing device 600, the productivity application 601 may perform a routine for inserting a formula at a location on a content surface in a user interface including, for example, one or more of the operations in the routine 500 described above. The aforementioned routine is illustrative, and the processing unit 602 may perform other routines. Generally, consistent with various embodiments, program modules may be provided which include routines, programs, components, data structures, and other types of structures that may perform particular tasks or that may implement particular abstract data types. Moreover, various embodiments may be practiced with other computer system configurations, including hand-held devices, multiprocessor systems, microprocessor-based or programmable consumer electronics, minicomputers, mainframe computers, and the like. Various embodiments may also be practiced in distributed computing environments where tasks are performed by remote processing devices that are linked through a communications network. In a distributed computing environment, program modules may be located in both local and remote memory storage devices.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the productivity application 601 may operate via application-specific logic integrated with other components of the computing device/system 600 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

Various embodiments, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. The system memory 604, removable storage 609, and non-removable storage 610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 600. Any such computer storage media may be part of the computing device 600. The computing device 600 may also have input device(s) 612 such as a keyboard, a mouse, a pen, a sound input device, a touch input device, etc. Output device(s) 614 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
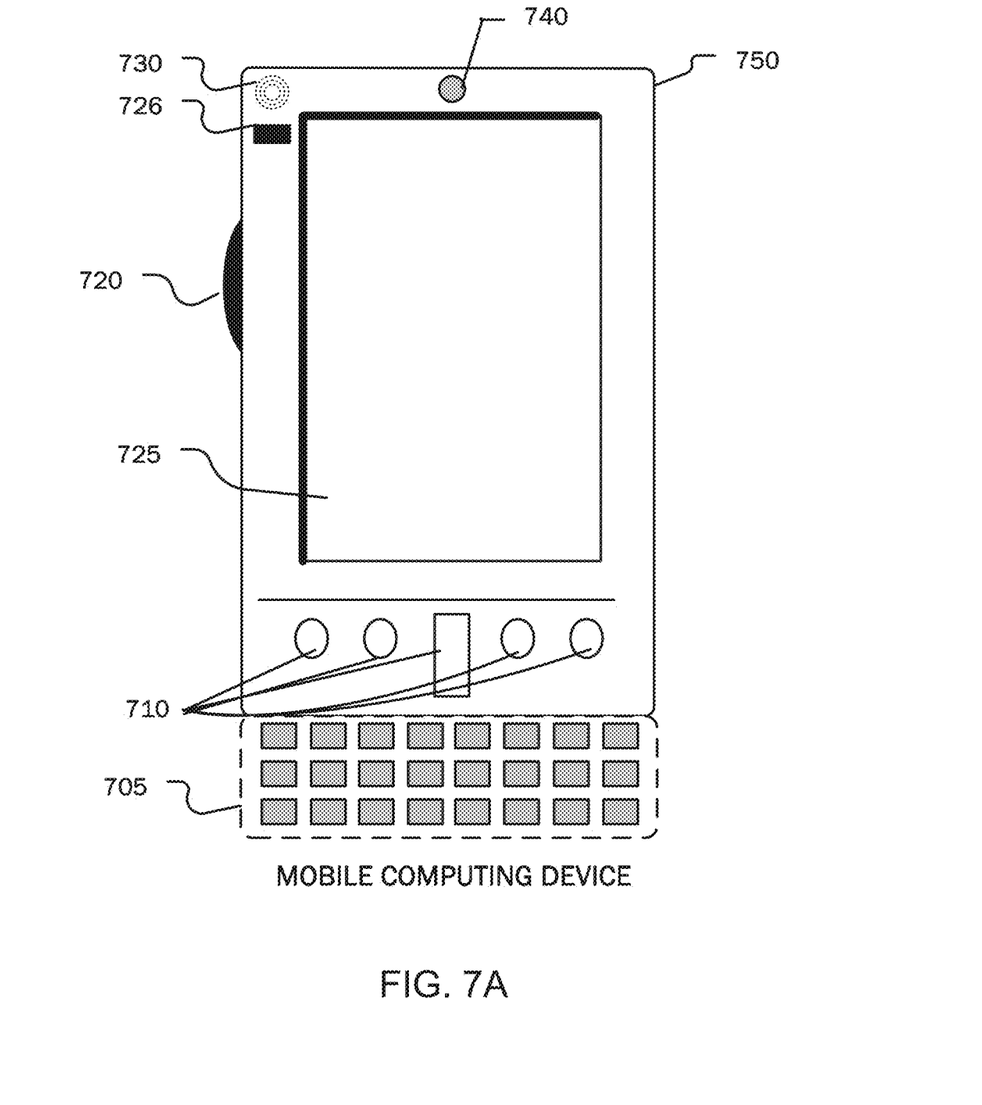
FIG. 7A is a simplified block diagram of a mobile computing device with which various embodiments may be practiced.
Figure 7B:
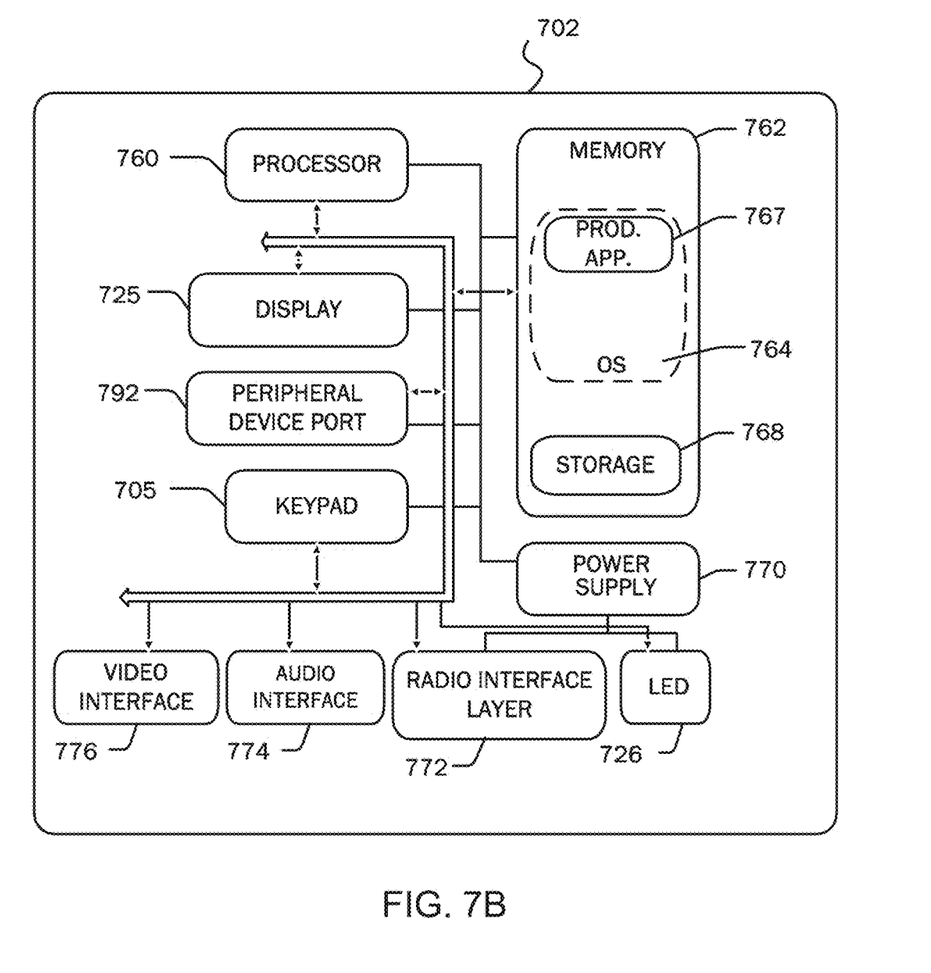
FIG. 7B is a simplified block diagram of a mobile computing device with which various embodiments may be practiced.

FIGS. 7A and 7B illustrate a suitable mobile computing environment, for example, a mobile computing device 750, a smartphone, a tablet personal computer, a laptop computer, and the like, with which various embodiments may be practiced. With reference to FIG. 7A, an example mobile computing device 750 for implementing the embodiments is illustrated. In a basic configuration, mobile computing device 750 is a handheld computer having both input elements and output elements. Input elements may include touch screen display 725 and input buttons 710 that allow the user to enter information into mobile computing device 750. Mobile computing device 750 may also incorporate an optional side input element 720 allowing further user input. Optional side input element 720 may be a rotary switch, a button, or any other type of manual input element. In alternative embodiments, mobile computing device 750 may incorporate more or less input elements. For example, display 725 may not be a touch screen in some embodiments. In yet another alternative embodiment, the mobile computing device is a portable phone system, such as a cellular phone having display 725 and input buttons 710. Mobile computing device 750 may also include an optional keypad 705. Optional keypad 705 may be a physical keypad or a "soft" keypad generated on the touch screen display.

Mobile computing device 750 incorporates output elements, such as display 725, which can display a graphical user interface (GUI). Other output elements include speaker 730 and LED light 726. Additionally, mobile computing device 750 may incorporate a vibration module (not shown), which causes mobile computing device 750 to vibrate to notify the user of an event. In yet another embodiment, mobile computing device 750 may incorporate a headphone jack (not shown) for providing another means of providing output signals.

Although described herein in combination with mobile computing device 750, in alternative embodiments may be used in combination with any number of computer systems, such as in desktop environments, laptop or notebook computer systems, multiprocessor systems, micro-processor based or programmable consumer electronics, network PCs, mini computers, main frame computers and the like. Various embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate the various embodiments described herein.

FIG. 7B is a block diagram illustrating components of a mobile computing device used in one embodiment, such as the mobile computing device 750 shown in FIG. 7A. That is, mobile computing device 750 can incorporate a system 702 to implement some embodiments. For example, system 702 can be used in implementing a "smart phone" that can run one or more applications similar to those of a desktop or notebook computer such as, for example, the productivity application discussed above with respect to FIGS. 1-6 as well as other applications. In some embodiments, the system 702 is integrated as a computing device, such as an integrated personal digital assistant (PDA) and wireless phone.

A productivity application 767 may be loaded into memory 762 and run on or in association with an operating system 764. The spreadsheet application 767 may be perform a routine for inserting a formula at a location on a content surface in a user interface including, for example, one or more of the operations in routine 500 described above. The system 702 also includes non-volatile storage 768 within memory the 762. Non-volatile storage 768 may be used to store persistent information that should not be lost if system 702 is powered down. The productivity application 767 may use and store information in the non-volatile storage 768. A synchronization application (not shown) also resides on system 702 and is programmed to interact with a corresponding synchronization application resident on a host computer to keep the information stored in the non-volatile storage 768 synchronized with corresponding information stored at the host computer. As should be appreciated, other applications may also be loaded into the memory 762 and run on the mobile computing device 750.

The system 702 has a power supply 770, which may be implemented as one or more batteries. The power supply 770 might further include an external power source, such as an AC adapter or a powered docking cradle that supplements or recharges the batteries.

The system 702 may also include a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of OS 764. In other words, communications received by the radio 772 may be disseminated to the productivity application 767 via OS 764, and vice versa.

The radio 772 allows the system 702 to communicate with other computing devices, such as over a network. The radio 772 is one example of communication media. The embodiment of the system 702 is shown with two types of notification output devices: an LED 780 that can be used to provide visual notifications and an audio interface 774 that can be used with speaker 730 to provide audio notifications. These devices may be directly coupled to the power supply 770 so that when activated, they remain on for a duration dictated by the notification mechanism even though processor 760 and other components might shut down for conserving battery power. The LED 780 may be programmed to remain on indefinitely until the user takes action to indicate the powered-on status of the device. The audio interface 774 is used to provide audible signals to and receive audible signals from the user. For example, in addition to being coupled to speaker 730, the audio interface 774 may also be coupled to a microphone (not shown) to receive audible input, such as to facilitate a telephone conversation. In accordance with embodiments, the microphone may also serve as an audio sensor to facilitate control of notifications. The system 702 may further include a video interface 776 that enables an operation of on-board camera 730 to record still images, video stream, and the like.

A mobile computing device implementing the system 702 may have additional features or functionality. For example, the device may also include additional data storage devices (removable and/or non-removable) such as, magnetic disks, optical disks, or tape. Such additional storage is illustrated in FIG. 7B by storage 768.

Data/information generated or captured by the mobile computing device 750 and stored via the system 702 may be stored locally on the mobile computing device 750, as described above, or the data may be stored on any number of storage media that may be accessed by the device via the radio 772 or via a wired connection between the mobile computing device 750 and a separate computing device associated with the mobile computing device 750, for example, a server computer in a distributed computing network such as the Internet. As should be appreciated such data/information may be accessed via the mobile computing device 750 via the radio 772 or via a distributed computing network. Similarly, such data/information may be readily transferred between computing devices for storage and use according to well-known data/information transfer and storage means, including electronic mail and collaborative data/information sharing systems.

Figure 8:
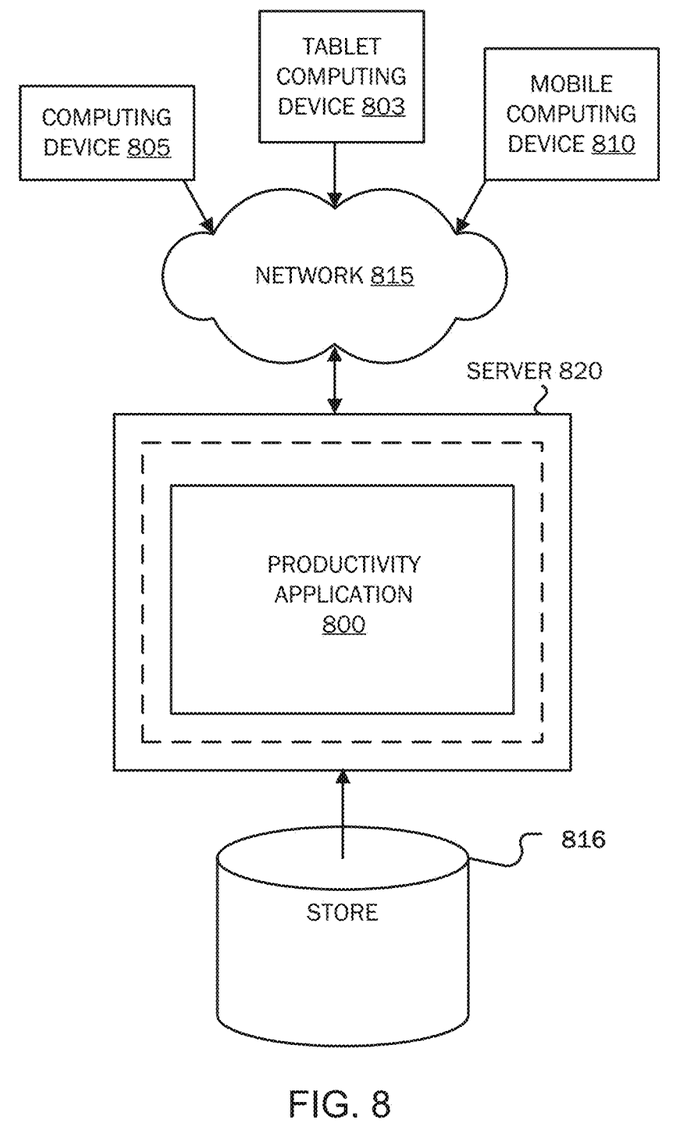
FIG. 8 is a simplified block diagram of a distributed computing system in which various embodiments may be practiced.

FIG. 8 is a simplified block diagram of a distributed computing system in which various embodiments may be practiced. The distributed computing system may include number of client devices such as a computing device 805, a tablet computing device 803 and a mobile computing device 810. The client devices 805, 803 and 810 may be in communication with a distributed computing network 815 (e.g., the Internet). A server 820 is in communication with the client devices 805, 803 and 810 over the network 815. The server 820 may store productivity application 800 which may be utilized to perform a routine for inserting a formula at a location on a content surface in a user interface including, for example, one or more of the operations in routine 500 described above. The productivity application 800 on the server 820 may be utilized by the client devices 805, 803 and 810 (over the network 815) to generate electronic documents and for storing same in a store 816.

Various embodiments are described above with reference to block diagrams and/or operational illustrations of methods, systems, and computer program products. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

While certain embodiments have been described, other embodiments may exist. Furthermore, although various embodiments have been described as being associated with data stored in memory and other storage mediums, data can also be stored on or read from other types of computer-readable media, such as secondary storage devices (i.e., hard disks, floppy disks, or a CD-ROM), a carrier wave from the Internet, or other forms of RAM or ROM. Further, the disclosed routines' operations may be modified in any manner, including by reordering operations and/or inserting or operations, without departing from the embodiments described herein.

It will be apparent to those skilled in the art that various modifications or variations may be made without departing from the scope or spirit of the embodiments described herein. Other embodiments will be apparent to those skilled in the art from consideration of the specification and practice of the embodiments described herein.

What is claimed is:

1. A computer-implemented method for inserting a formula at a location on a content surface in a user interface, comprising:
   receiving in the user interface, by the computer, a selection of data values displayed on the content surface in the user interface;
   displaying in the user interface, by a computer, a status bar comprising calculation icons, wherein the calculation icons display at least one automatically generated predetermined calculation result, the predetermined calculation result being automatically generated based on the selected data values;
   receiving in the user interface, by the computer, a selection of at least one of the calculation icons in the status bar;
   inserting in the user interface, by the computer, at least one formula corresponding to the selected at least one of the calculation icons at a selected drop location on the content surface; and
   automatically generating in the user interface the predetermined calculation result based on the at least one formula corresponding to the selected at least one of the calculation icons.

2. The method of claim 1, further comprising receiving, in the user interface, a selection of a range of values on the content surface prior to displaying in the user interface, by a computer, a status bar comprising at least one of the calculation icons.

3. The method of claim 1, further comprising automatically inserting a descriptive label in the content surface adjacent to at least one of the calculation icons.

4. The method of claim 1, further comprising adding at least one custom calculation to the status bar in the user interface.

5. The method of claim 4, wherein adding at least one custom calculation to the status bar in the user interface comprises dragging at least one custom formula to the status bar.

6. The method of claim 1, wherein displaying in the user interface, by a computer, a status bar comprising calculation icons comprises displaying at least one aggregate function result.

7. The method of claim 6, wherein displaying at least one aggregate function result comprises displaying at least one function result selected from a group comprising: an average, a count, a minimum, a maximum, a numerical count and a sum.

8. The method of claim 1, wherein inserting in the user interface, by the computer, the selected at least one of the calculation icons at a selected drop location on the content surface comprises inserting the selected at least one of the calculation icons into a cell in a spreadsheet.

9. A computer system for inserting a formula at a location on a content surface in a user interface, comprising:
   a memory for storing executable program code; and
   a processor, functionally coupled to the memory, the processor being responsive to computer-executable instructions contained in the program code and operative to:
   receive, in the user interface, a selection of a range of values on the content surface;
   display, in the user interface a status bar comprising at least one calculation icon, the at least one calculation icon being automatically generated based on the selection of the range of values, wherein the at least one calculation icon displays at least one automatically generated predetermined calculation result;
   receive, in the user interface a selection of the at least one calculation icon in the status bar;
   insert, in the user interface, at least one formula corresponding to the selected at least one calculation icon at a selected drop location on the content surface; and
   automatically generate, in the user interface, the predetermined calculation result based on the at least one formula corresponding to the selected at least one predetermined calculation.

10. The system of claim 9, wherein the processor is further operative to automatically insert, in the user interface, a descriptive label in the content surface adjacent to the at least one calculation icon.

11. The system of claim 9, wherein the processor is further operative to add at least one custom calculation to the status bar in the user interface.

12. The system of claim 11, wherein the processor, in adding at least one custom calculation to the status bar in the user interface, is further operative to drag at least one custom formula to the status bar.

13. The system of claim 9, wherein the at least one calculation icon comprises at least one aggregate function result.

14. The system of claim 13, wherein the at least one aggregate function result comprises at least one function result selected from a group comprising: an average, a count, a minimum, a maximum, a numerical count and a sum.

15. The system of claim 9, wherein the content surface comprises a spreadsheet.

16. The system of claim 15, wherein the drop location comprises a cell in the spreadsheet.

17. A computer-readable storage medium comprising computer executable instructions which, when executed by a computer, will cause the computer to perform a method for inserting a formula in a cell in a spreadsheet, comprising:

receiving, in the user interface, a selection of a range of cells in the spreadsheet, the range of cells comprising a plurality of values;

displaying, in the user interface, a status bar comprising at least one predetermined aggregate function result, the at least one predetermined aggregate function result being automatically generated based on the selection of the range of cells;

receiving, in the user interface, a selection of the at least one predetermined aggregate function result in the status bar;

automatically generating, in the user interface, the predetermined calculation resulted based on a formula corresponding to the selected at least one predetermined aggregate function result; and automatically inserting, in the user interface, a descriptive label in a cell adjacent to the cell in which the formula corresponding to the selected at least one predetermined aggregate function result was generated.

18. The computer-readable storage medium of claim 17, further comprising adding at least one custom calculation to the status bar in the user interface.

19. The computer-readable storage medium of claim 18, wherein adding at least one custom calculation to the status bar in the user interface comprises dragging at least one custom formula to the status bar.

20. The computer-readable storage medium of claim 17, wherein displaying, in the user interface, at least one predetermined aggregate function result comprises displaying at least one function result selected from a group comprising: an average, a count, a minimum, a maximum, a numerical count and a sum.

* * * * *